- d-line
- c-line
- A'-line
- Wavelength 800 mµ

United States Patent Office 3,554,629
Patented Jan. 12, 1971

3,554,629
ADAPTER LENS FOR MINIMIZING CHROMATIC ABERRATION IN THE INFRARED RANGE
Yasuo Takahashi, Tokyo-to, Japan, assignor to Asahi Kogaku Kogyo Kabushiki Kaisha, Tokyo-to, Japan, a corporation of Japan
Filed Mar. 27, 1968, Ser. No. 716,474
Claims priority, application Japan, Apr. 3, 1967, 42/20,759
Int. Cl. G02b 13/14
U.S. Cl. 350—2
4 Claims

ABSTRACT OF THE DISCLOSURE

An adapter lens system is mounted on the front of a photographic object lens having a focal length between 135 mm. and 300 mm. and includes a fluorite lens of a focal length between 350 mm. and 500 mm. and a negative lens of greater refractive index, the adapter lens system having a focal length of infinity. The adapter lens reduces chromatic aberration of the lens system in the infrared range.

BACKGROUND OF THE INVENTION

The present invention relates generally to improvements in photographic objective lens systems and it relates particularly to an improved adapter lens system for long focal length camera objectives for minimizing the chromatic aberration of the overall lens system in the infrared range.

The conventional long focal length photographic objective lens systems, as typified by those having a focal length of 135 mm. or more, possess an important drawback when employed in infrared photography. The conventional photographic objective lens systems are designed to minimize aberrations in the visible light range and aberration corrections generally represent a compromise. The chromatic aberration of these lens systems in the infrared and near infrared range of the spectrum is very high so that their use in infrared photography leaves much to be desired. Another drawback in the employment of the conventional long focal length ojective lens in infrared photography is the shift of the focal plane of the lens between the visible light and the infrared red band so that sharp focusing is difficult since if a visible light image is focused in a plane, the image in the infrared range on the plane is not in sharp focus.

SUMMARY OF THE INVENTION

It is a principal object of the present invention to provide an improved objective lens system.

Another object of the present invention is to provide an improved objective lens system for infrared photography.

Still another object of the present invention is to provide an improved lens for adapting a conventional camera objective lens to infrared photography.

A further object of the present invention is to provide an improved infrared adapter lens for long focal length camera objective lenses which greatly reduces chromatic aberration in the infrared range.

Still a further objective of the present invention is to provide an improved infrared adapter lens for long focal length camera objective lenses which minimizes the shift of the image focal plane between the visible and infrared bands.

Another object of the present invention is to provide an infrared adapter lens of the above nature characterized by its simplicity, versatility and adaptability.

The above and other objects of the present invention will become apparent from a reading of the following description taken in conjunction with the accompanying drawings which illustrate preferred embodiments thereof.

In a sense the present invention contemplates the provision of an adapter lens system for objective lens systems of focal lengths between 135 mm. and 300 mm. which adapter lens system comprises a positive fluorite lens of a focal length between 350 mm. and 500 mm. The optical properties of the fluorite lens are such that the chromatic aberration of the objective lens system is radically reduced and the shift of the image focal plane between the visible light region and the infrared region is minimized. The fluorite lens is advantageously formed of synthetic fluorite which is widely available.

The chromatic aberration of a photographic objective lens system increases with increased focal length and it is difficult to adequately minimize second order chromatic aberration with conventional optical glass. The use of the fluorite adapter lens in accordance with the present invention substantially eliminates chromatic aberration of the second order. To eliminate the chromatic aberration of a long focal length objective lens system, the power of the adapter fluorite positive lens must be relatively great whereas with an objective lens system of shorter focal length, correction of chromatic aberration may be relatively small so that the power of the adapter lens may be relatively small. Thus, within the necessary range, correction of chromatic aberration is possible without a great variation in the power of the fluorite lens.

As set forth above the adapter lens system in accordance with the present invention is characterized by the provision of a positive fluorite lens of a focal length between 350 mm. and 500 mm. In addition, the adapter lens system includes a negative lens formed of a material having a higher refractive index than the fluorite, preferably between 1.45 and 1.7, and the positive and negative lens advantageously have complementary faces and are cemented to form a unit lens. The focal length of the adapter lens system including the fluorite positive lens and the negative lens preferably infinite. The adapter lens system is mounted in an adapter ring in the known manner which permits its separable axial mounting on the front of the objective lens barrel. When mounted in the objective lens barrel, the axial spacing between the objective lens front face and the adapter lens rear face is advantageously between 0.5 mm. and 700 mm.

BRIEF DESCRIPTION OF THE DRAWINGS

FIGS. 2(A) to 2(C) are curves indicating the chromatic differences of spherical aberration of three different objective lens systems respectively, in the absence of the improved adapter lens system.

DESCRIPTION OF THE PREFERRED EMBODIMENTS

Figures 1, 2:
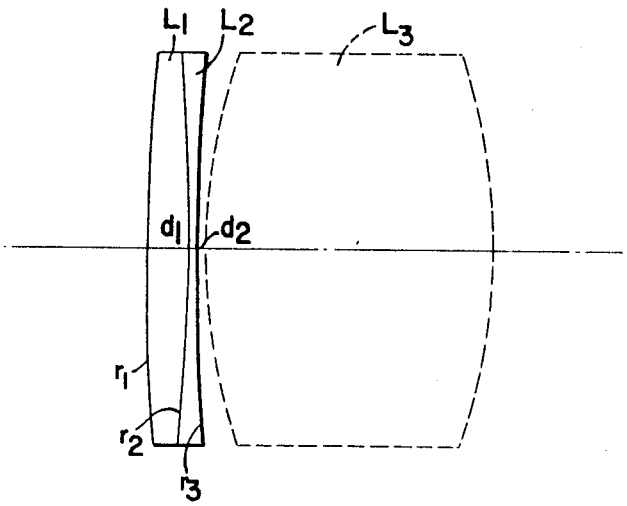
FIG. 1 is a longitudinal sectional view of an adapter lens embodying the present invention, the main objective lens being illustrated in outline by broken line.

Referring now to the drawings which illustrate preferred embodiments of the present invention, the reference letter L3 generally designates a conventional long focal length objective lens system to the front of which the improved adapter lens is attached.

The improved adapter lens system includes a positive fluorite lens L1 and a negative lens L2 having complementary confronting faces and cemented together to form a composite unit. The lens L1 has a front convex face of radius of curvature $r_1$, a rear face of radius of curvature $r_2$, an axial thickness $d_1$, an index of refraction $n_1$ and an Abbe value $V_1$. The lens L2 has a front face of radius of curvature $r_2$, and a rear face of radius of curvature $r_3$, an axial thickness $d_2$, an index of refraction $n_2$, and an Abbe value $V_2$. The axial distance between the rear face of lens L2 and the front face of objective lens system L3 is 1.

The following tables set forth the dimensions and data of specific adapter lens systems in accordance with the present invention, the designated dimensions being as above identified.

TABLE I

| $r_1=335.00$ | | | |
|---|---|---|---|
| $r_2=-374.53$ | $d_1=7.5$ | $n_1=1.43387$ | $V_1=95.2$ |
| $r_3=445.66$ | $d_2=1.5$ | $n_2=1.50137$ | $V_2=56.5$ |
| | $1=1.0$ | | |

The specific adapter lens system of Table I is for use with a 1:4.0 objective lens system of focal length $f=300$ mm. The adapter lens system has a focal length of infinity, and the positive fluorite lens L1 has a focal length of 408.8 mm.

Figure 3A:
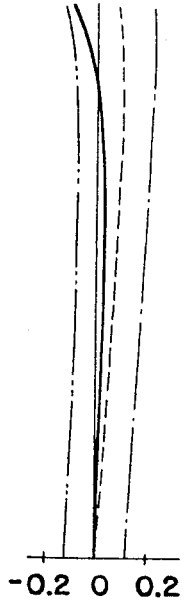
FIGS. 3(A) to 3(C) are similar to FIGS. 2(A) to 2(C) for corresponding objective lens system provided with adapter lens in accordance with the present invention.

The chromatic aberration curves of the objective lens system without and with the adapter lens system are shown in FIGS. 2(A) and 3(A) respectively. It is clear from these curves that the chromatic aberration in the red and infrared regions as typified by the A1, C, and 8000 angstrom unit lines, is radically reduced.

TABLE II

| $r_1=450.00$ | | | |
|---|---|---|---|
| $r_2=-300.00$ | $d_1=5.0$ | $n_1=1.43387$ | $V_1=95.2$ |
| $r_3=719.42$ | $d_2=2.5$ | $n_2=1.51118$ | $V_2=50.9$ |
| | $1=3.0$ | | |

The specific adapter lens system of Table II is for use with a 1:4.0 objective lens system of focal length $f=200$ mm. The subject adapter lens system including lenses L1 and L2 has a focal length of infinity and the fluorite lens L1 has a focal length of 415.7 mm.

Figure 2B:
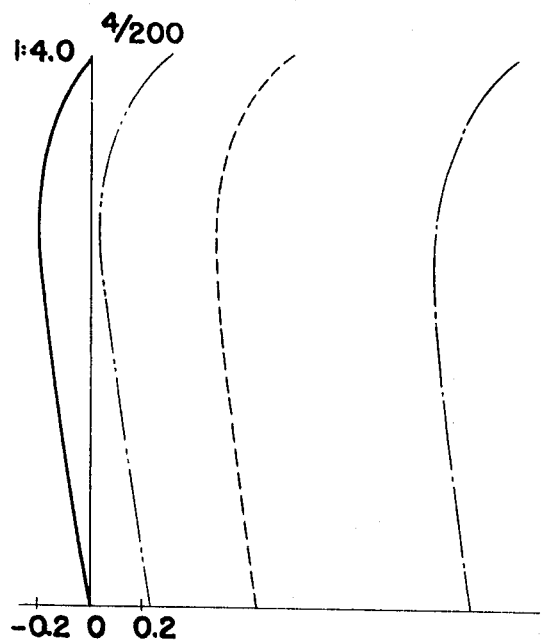
Figure 3B:
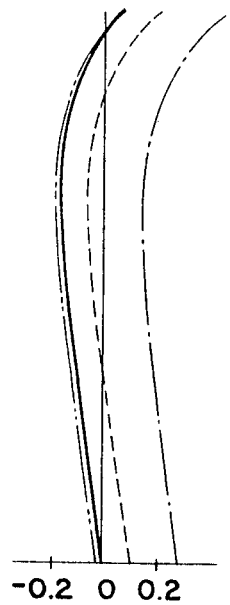

The chromatic aberratiton curves of the objective lens system with and without the adapter lens system are shown in FIGS. 2(B) and 3(B) respectively and demonstrate the great reduction of chromatic aberration in the red and infrared region.

TABLE III

| $r_1=450.00$ | | | |
|---|---|---|---|
| $r_2=-308.48$ | $d_1=5.0$ | $n_1=1.43387$ | $V_1=95.2$ |
| $r_3=1782.50$ | $d_2=2.5$ | $n_2=1.62588$ | $V_2=35.6$ |
| | $1=1.0$ | | |

The specific adapter lens system of Table III is designed for a 1:3.5 objective lens system of focal length $f=135$ mm. The subject adapted lens system a focal length of infinity and the fluorite lens L1 has a focal length of 422.4 mm.

Figure 2C:
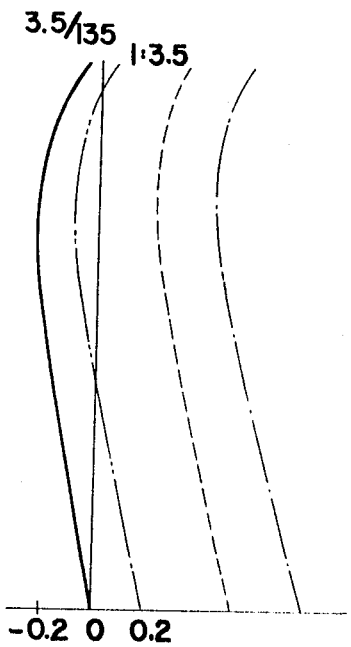
Figure 3C:
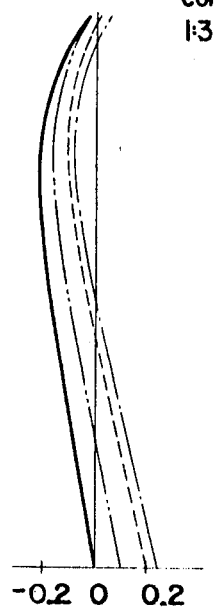

The chromatic aberration curves of the objective lens system with and without the adapter lens system are shown in FIGS. 2(C) and 3(C) respectively and again demonstrate the radical reduction of chromatic aberration in the red and infrared regions.

While there have been described and illustrated preferred embodiments of the present invention, it is apparent that numerous alterations, additions and omissions may be made without departing from the spirit thereof.

What is claimed is:

1. In combination with a main objective lens system of a focal length between 135 mm. and 300 mm., a correction doublet of substantially infinite focal length in front of said main objective lens system consisting of a positive fluorite lens having a focal length between 350 mm. and 500 mm., and in mating contact with said fluorite lens, a negative lens having an index of refraction greater than that of said fluorite lens whereby the chromatic aberration of the objective lens system is radically reduced and the shift of the image focal plane between the visible light region and the infrared region is minimized.

2. An infrared correction lens system including a positive fluorite lens and a negative lens having a face in mating engagement with a face of said fluorite lens and having the following dimensions:

| $r_1=335.00$ | | |
|---|---|---|
| $r_2=-374.53$ | $d_1=7.5$ | $n_1=1.43387$ |
| $r_3=445.66$ | $d_2=1.5$ | $n_2=1.50137$ | wherein $r_1$, $r_2$ and $r_3$ are the radii of curvature of the outer face of the fluorite lens, the confronting faces of the lenses and the outer face of the negative lens respectively, $d_1$ and $d_2$ are the thicknesses of the fluorite and negative lenses respectively, and $n_1$ and $n_2$ are the refractive indices of the fluorite and negative lens respectively.

3. An infrared correction lens system including a positive fluorite lens and a negative lens having a face in mating engagement with a face of said fluorite lens and having the following dimensions:

| $r_1=450.00$ | | |
|---|---|---|
| $r_2=-300.00$ | $d_1=5.0$ | $n_1=1.43387$ |
| $r_3=719.42$ | $d_2=2.5$ | $n_2=1.51118$ | wherein $r_1$, $r_2$ and $r_3$ are the radii of curvature of the outer face of the fluorite lens, the confronting faces of the lenses and the outer face of the negative lens respectively, $d_1$ and $d_2$ are the thicknesses of the fluorite and negative lenses respectively, and $n_1$ and $n_2$ are the refractive indices of the fluorite and negative lens respectively.

4. An infrared correction lens system including a positive fluorite lens and a negative lens having a face in mating engagement with a face of said fluorite and having the following dimensions:

| $r_1=450.00$ | | |
|---|---|---|
| $r_2=-308.48$ | $d_1=5.0$ | $n_1=1.43387$ |
| $r_3=1782.50$ | $d_2=2.5$ | $n_2=1.62588$ | wherein $r_1$, $r_2$ and $r_3$ are the radii of curvature of the outer face of the fluorite lens, the confronting faces of the lenses, and the outer face of the negative lens respectively, $d_1$ and $d_2$ are the thicknesses of the fluorite and negative lenses respectively, and $n_1$ and $n_2$ are the refractive indices of the fluorite and negative lens respectively.

References Cited

UNITED STATES PATENTS 2,165,365   7/1939   Frederick et al. _____ 350—2UX

JOHN K. CORBIN, Primary Examiner

U.S. Cl. X.R.

350—117, 183, 212, 233